(12) United States Patent
Ruiz Nayem et al.

(10) Patent No.: US 12,178,194 B2
(45) Date of Patent: Dec. 31, 2024

(54) ALTAMAR MOBILE FISH FARMING CENTER FOR THE DEVELOPMENT OF HYDROBIOLOGICAL SPECIES

(71) Applicant: OATECH SPA, Puerto Montt (CL)

(72) Inventors: Hector Ruiz Nayem, Puerto Montt (CL); Rodrigo Sanchez Raccaro, Puerto Montt (CL)

(73) Assignee: OATECH SPA, Puerto Montt (CL)

( * ) Notice: Subject to any disclaimer, the term of this patent is extended or adjusted under 35 U.S.C. 154(b) by 465 days.

(21) Appl. No.: 17/416,917

(22) PCT Filed: Dec. 21, 2018

(86) PCT No.: PCT/CL2018/050144
§ 371 (c)(1),
(2) Date: Jun. 21, 2021

(87) PCT Pub. No.: WO2020/124278
PCT Pub. Date: Jun. 25, 2020

(65) Prior Publication Data
US 2022/0061278 A1 Mar. 3, 2022

(51) Int. Cl.
*A01K 61/00* (2017.01)
*A01K 61/10* (2017.01)
(Continued)

(52) U.S. Cl.
CPC .............. *A01K 61/60* (2017.01); *A01K 61/10* (2017.01); *B63B 35/44* (2013.01)

(58) Field of Classification Search
None
See application file for complete search history.

(56) References Cited

U.S. PATENT DOCUMENTS 3,237,339 A * 12/1961 Rice ................ A01K 97/04
4,930,444 A *  6/1990 Vasile ............... A01K 63/00
                                                                      119/3
(Continued)

FOREIGN PATENT DOCUMENTS

CL     2016001709 A1    2/2017
CN      108557023 A     9/2018
(Continued)

OTHER PUBLICATIONS

Ocean Farming Vessel; R. Villegas, YouTube (video); Mar. 6, 2017; www.youtube.com/watch?v=kzSRhjl6qtA.
(Continued)

*Primary Examiner* — Joshua J Michener
*Assistant Examiner* — Henry Hooper Mudd

(57) ABSTRACT

A mobile farm for the growth of hydrobiological species, capable of offshore operation, which maintains a shoal-like behaviour of the fish confined therein, and being of robust design and construction. The use of related materials enables the structure to remain afloat, anchored, moored to a buoy or in movement, either self-propelled, towed or pushed. Formed by a central structure similar to a ship's hull, its hydrodynamic bow enables it to cut through the waves with minimum resistance, reinforced by a perimetral support; these combine with the use of heavyweight metallic meshes, thus constituting a floating means suited for offshore operation, with the ability to alter its draught and hydrodynamic presentation, consequently changing the containment volume of the species by means of a system for the individual or collective hoisting of the containment meshes.

9 Claims, 7 Drawing Sheets

(51) Int. Cl.
   *A01K 61/60*   (2017.01)
   *B63B 35/44*   (2006.01)

(56) References Cited

U.S. PATENT DOCUMENTS

| | | | | |
|---|---|---|---|---|
| 9,944,354 | B1* | 4/2018 | O'Neal | B63B 27/14 1/14 |
| 2002/0104469 | A1* | 8/2002 | Veazy | E02B 3/04 114/65 A |
| 2015/0272018 | A1* | 10/2015 | Menard | A01G 31/02 31/2 |
| 2019/0200583 | A1* | 7/2019 | Vieira | A01K 61/80 61/80 |

FOREIGN PATENT DOCUMENTS

| | | |
|---|---|---|
| EP | 3278662 A1 | 2/2018 |
| ES | 2002955 A6 | 10/1988 |
| ES | 2208007 A1 | 6/2004 |
| ES | 2221784 A1 | 1/2005 |
| FR | 2699048 A1 | 6/1994 |
| GB | 1450575 A | 9/1976 |

OTHER PUBLICATIONS

Salmonexpert, Hecho en Chile: lanzan nuevo proyecto de acuicultura oceanica (video); Jun. 7, 2018; www.salmonexpert.cl/article/hecho-en-chile-lanzan-nuevo-proyecto-de-acuicultura-ocenica.

NSK-3417 Offshore Fish Farm (Havfarm); NSK Ship Design; YouTube (video); Feb. 8, 2016; www.youtube.com/watch?v=6Tvpny5WxyM.

International Search Report for Corresponding International Application No. PCT/CL2018/050144 dated Jul. 12, 2019 and English translation.

"Made in Chile: new ocean aquaculture project launched (video)", SALMONEXPERT, Jun. 7, 2018 (Jun. 7, 2018), retrieved from the Internet <salmonexpert.cl/hecho-en-chile-lanzan-nuevo-proyecto-de-acuicultura-oceanica-video/1212166>, and English machine translation.

* cited by examiner

ALTAMAR MOBILE FISH FARMING CENTER FOR THE DEVELOPMENT OF HYDROBIOLOGICAL SPECIES

CROSS REFERENCE TO RELATED APPLICATION

This Application is a 371 of PCT/CL2018/050144 filed on Dec. 21, 2018, which is incorporated herein by reference.

DESCRIPTIVE MEMORY

During the last decades of the 20th century, the use of various naval devices, floating rafts and cages worldwide in the breeding, fattening and production of hydrobiological species (fish production center) became widespread, generating great economic activity. The coastal edge, associated with protected areas from waves and sea currents, has traditionally been the preferred one to locate the structures in said activity.

This positioning of the fish productions center near the coast and the constant use of a certain zones or geographic area, generated, among other problems, the risk of contamination produced by the activity itself, with consequences for the environment and the effects of contagion or contamination by part of external agents, such as microalgae, increased water temperature, diseases, decreased oxygen, etc.

On the other hand, this productive activity, to a certain extent, has generated social conflicts, since it competes for the natural space that different communities used for economic support purposes, together with the generation of acoustic and visual pollution in some cases.

Likewise, keeping the cultivation or production centers positioned in a specific place near the coast, necessarily requires the use of a laborious (intricate and expensive) anchoring system, which ensures the permanence of the floating elements in the designated area and also it constitutes a critical and risk component, since all the confined specimens depend on the system associated to that fixed place that in turn is tied (anchored) to the seabed. This requires the use of larger anchors with their own characteristics that induce the formation of contaminating fouling interfering with the natural seabed, a situation that in turn competes with local fishermen as mentioned.

In addition to the above, the effects that climate change has generated must be considered, since the conditions for aquaculture are changing randomly in the current areas that were considered suitable for this activity, making it increasingly difficult to project representative productive results in the future. Due to this, this mobile offshore farming center was designed with the ability to be moved as the conditions of the areas suitable for aquaculture change as a result of the so-called Climate Change.

Notwithstanding the foregoing, the global need for food production and especially protein, continues to grow, making it necessary to have better spaces to meet both current and future demand. In this order of ideas, the sea is presented as the best development option, since it covers more than 70% of the planet's surface, and only its coastal edge is used.

On the other hand, the need to produce fish in a sustainable way in order to feed the growing increase in the world population, necessarily implies the application of new technologies and techniques that allow designs to imitate and generate, in the closest way possible, natural conditions accordingly with each species, which is the goal in this type of fish farming cultivation center, generating space for each species in its natural state, maintaining the oceanic shoal-like behavior.

Consistent with the above, at present, it is possible to develop economic activities on the high seas, under the protection of International Maritime Law, at the level of international relations and its effects, current treaties and controversies on the exploitation of the oceans for the benefit of nations, even those that do not have a sea are allowed to develop economic activities, without interference with third states, due to the fact that it is possible to operate in the international high seas, without affecting the economic interests of third parties, since said space is considered as exploitation heritage of the humanity.

Therefore, it is necessary to have new areas of hydrobiological species productions that allow decompressing the coastal zone, in such a way as to be able to develop the activity in places where chemical, biological and physical variables increase efficiency in productivity and, on the other hand, do not affect or compete with the portions of water that by nature has been used by fishermen or local population of coastal areas to feed themselves and/or subsist.

The new positioning of the aquaculture's activities does not come without difficulties, since it necessarily has to move to exposed oceanic areas, or high energy areas, off-shore areas, or the high seas, for which It becomes essential to have hydrobiological species production centers that are capable of facing or moving away from complex situations such as adverse meteorological conditions, which have augmented in intensity during the last decades, increased wave size, wind force, among others.

In this way, and without prejudice to the fact that the concept of aquaculture or confinement and fattening of hydrobiological species in exposed areas has been previously addressed by means of other structures or systems, the proposed solution consists of a mobile hydrobiological species production center that works on the surface, made of an effective and efficient size, with fast moving ability, easy to operate and maintain, efficient with respect to construction and operation costs, allowing the development of hydrobiological species in exposed areas, with the ability to vary the depth and shape of its bottom, capable of navigating in a timely manner from one position or cultivation area to another, thanks to its propulsion system, or to be moved by towing or ramming by an offshore tug at the operators will, which allows the transfer or self-transfer, to ideal optimal areas that improve growing conditions, or moving away from adverse weather conditions such as high waves, storms, hurricanes, typhoons, tsunamis or any other risks associated with winds, currents or marine pollution, bearing in mind global warming and its proven effects on the hardening of climatic conditions on the planet. Its ability to take a buoy, or use an anchor for its temporary anchoring, significantly reduces reaction times, which ultimately allows the development of a breeding of confined hydrobiological species in areas where they naturally develop, achieving a shoal behavior of the contained species, thanks to the variability of the size of the containment area, since there is direct contact between the species and the water, currents, and the various elements that condition it, such as temperature, oxygenation, etc, capability which is maximized due the ability to navigate long distances, allowing the proposed production center to travel not only to the most efficient breeding areas, but also dock or approach directly to slaughter areas, consumption centers or distribution.

STATE OF THE ART

Various solutions have tried to respond to the needs that exist today to the problems described, without being able to respond efficiently and safely to the challenges posed by the special operating conditions in the so-called Off Shore areas.

For decades there have been modifications to the already traditional fish farming centers, all trying to achieve an operation in open waters, such as FR 2687286 that presents a submersible aquatic breeding structure in the open sea, which consists of a complicated and doubly reinforced anchoring system to the seabed, which would ensure its permanence in one place and definitively, a solution that certainly does not provide answers in terms of mobility, given its particular anchoring maneuvers.

In an attempt to grant some mobility to traditional raft/cage systems, novelties have been presented, such as the one attempted in ES 2002955 A6, in which a system of conventional cages capable of operating on the surface or submerged, but not in the form of independent unit, but adhered to a mother structure that permanently positions them to a specific place, without achieving mobility in their installation or operation.

The adaptation of existing ships or naval artifacts has also proven to be inefficient when it comes to solving the problem raised, such as ES 2208007 A1, a solution that presents modifications to an oil tanker vessel, to which one or more cages are installed, in whatever their storage warehouses, having to use an intricate system for pumping sea water in order to keep the species stored inside, with which, as said before, stable or reliable solutions are not obtained, since these modified structures are limited to the original design and size of the oil tanker and not to what the hydrobiological species really need.

Other mobile structures for the confinement and breeding of fish have been developed, such as the one presented in CL 201601709, which manages to solve part of the problem raised, but given its flexible structure, it does not seem to have the necessary response time, to react in a prompt manner to a change of position due to a meteorological emergency, since it presents a submersible solution to such events, without having the ability to vary the bottom or draft of its meshes, without the possibility of being rammed given the flexibility of his design.

BRIEF DESCRIPTION OF THE DRAWINGS

The following figures are attached for further illustration of the proposed mobile offshore cultivation center.

DESCRIPTION OF THE INVENTION

The present invention corresponds to a mobile farming or production center for the development of hydrobiological species, that maintains a shoal-like behavior in confined fish, capable of operating in the high seas of any ocean in the world, characterized by its ability to operate as a productive unit in surface in open sea areas, internationally known as Offshore, thanks to the robustness of its construction, and the materials such as naval steel and other related materials that allow the structure to remain afloat, whether anchored, taken from a buoy or in displacement, either on its own account, towed or rammed. The farming or production center is made up of a central naval hull-type structure, whose hydrodynamic bow allows wave cutting offering minimal water resistance, acting as a deflector thanks to its structural design, reducing the impact energy that the structure as a whole must face; It is also reinforced by a frame or perimeter support, which is combined with the use of heavy metal mesh, thus constituting a floating structure suitable for operating on the high seas.

The weight of the mesh is evenly distributed around the frame and the central hull of the production center, which further reduces the center of gravity and serves as a shock absorbing element for the sea waves, making the hydrobiological production center even more stable and reliable.

These three elements are part of the confinement area of the species, which also behave as a flotation structure and generate the framework that maintains the farming volume where the hydrobiological species will live, This conformation can be altered, consequently changing the volume of containment of the species through an individual or collective lifting system of the meshes from the support frame, thus allowing to adjust the hydrodynamic presentation of the farming center when navigating, decreasing its resistance to water, increasing the advance, or for the purposes of the development of management or other operations typical of the breeding activity such as the harvesting of fish and/or for sanitary management or selection of fish, or in order to navigate in shallow waters by decreasing its draft, being able, on the contrary, to deploy the meshes to maximum capacity, allowing the shoal-like behavior of the species confined inside, generating and improving animal welfare.

Having motorization and not depending on complicated anchoring maneuvers to stay in a certain position, allow the farm to navigate and move in a timely and rapid manner to different locations in order to find the best conditions for the development of the species, or avoid poor or intense weather conditions, transfer that can also be carried out by itself or with the help of offshore tugs, since it is characterized by the robustness of its design, which allows its towing or ramming from any angle, being able to support coupling or berthing from other vessels to its structure.

Figure 1:
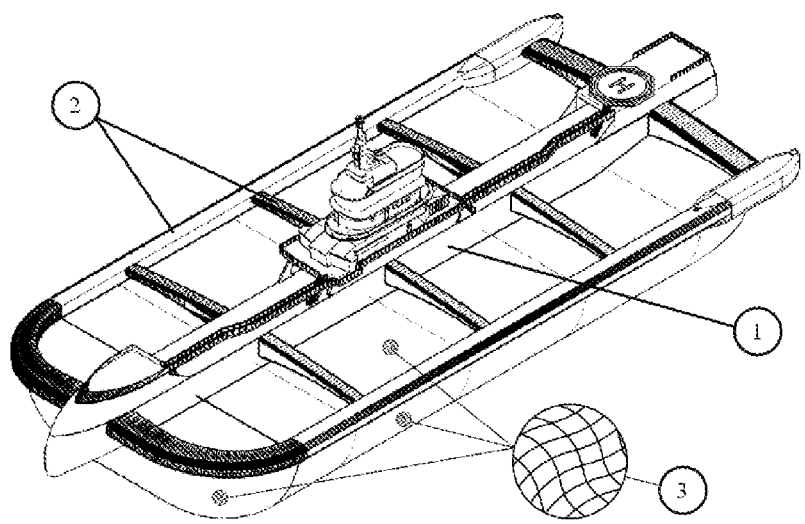
FIG. 1 shows an isometric or three-dimensional view of the mobile offshore cultivation center of the present invention.

Notwithstanding the fact that the concept and proposed solution can adopt different design forms, including a central hull supported by stabilization arms, or two or three catamaran or trimaran type hulls, respectively, for the purpose of visualizing the solution in This case, and as can be seen in FIG. 1, is presented in a central hull design (1) within which the living areas and bedrooms of the crew, storage, silos with the food of the hydrobiological species are located, along with the motorization of the center, which has a lateral projection support frame, (2) that provides stability and buoyancy, also allows the generation of the containment area for hydrobiological species, supporting the use of metal meshes and/or heavy weight, preferably built based on copper alloys given its antifouling conditions and structural behavior (3). These three elements, hull, support frame and metal and/or heavy weight meshes, converge in the design in a unique way that allows the maintenance without significant deformations of the containment area of the hydrobiological species in rearing or fattening, even when they are in movement, being able to withstand the currents and waves of the exposed areas or offshore, either anchored or in motion.

Figure 2:
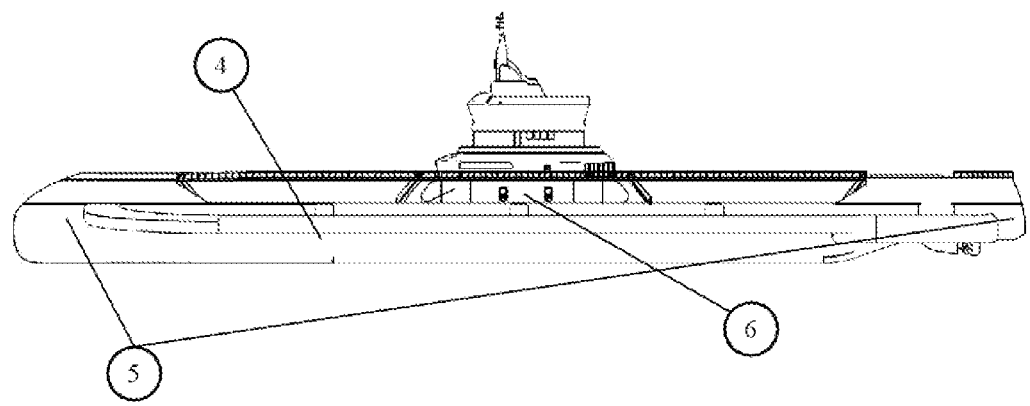
FIG. 2 shows a side view of the mobile offshore cultivation center and an isometric view of the mobile offshore cultivation center without the mesh.
Figure 2:
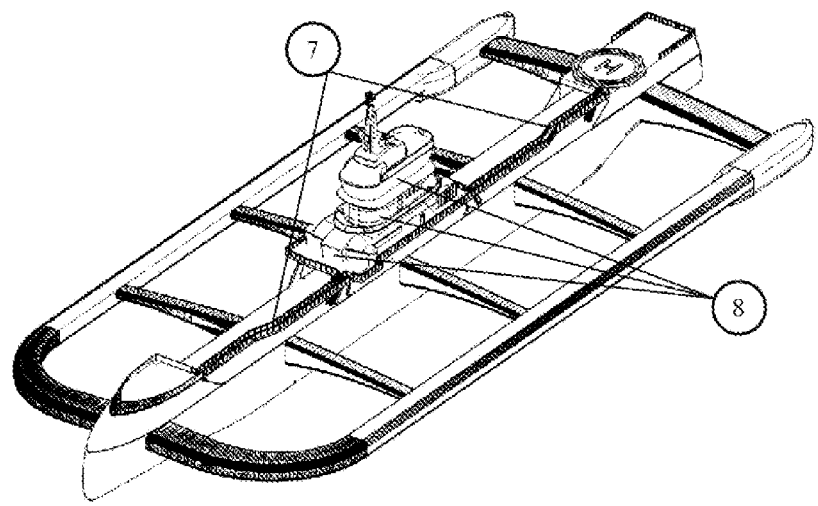

This relationship of three elements is directly benefited with the ability to vary the draft of the structure, thanks to its lifting system by individual or simultaneous panels, which not only varies the hydrodynamic presentation of the total structure, allowing the development of speeds higher displacement, thanks to the reduction of the contact surface with the water, but also allows and collaborates in the development of the various management that must be implemented during the breeding or growth of the species FIG. 2, shows us in particular two views of the structure or central hull of the invention (1), appreciating the Main Container Unit, in charge of providing buoyancy to the set, which provides the living areas and bedrooms of the crew, storage, silos for feeding the hydrobiological species and motorization of the production center, also contributing with the volume for the stability of the production center and for the containment of the elements necessary for the functioning of all the navigability systems, functioning and operation of this center of production. Its design is characterized by its particular level of Flotation (2), which allows the whole unit, once in operation, and with all the cargo and supplies necessary for its autonomous operation, that its first deck is surpassed by large waves, without its normal functioning being affected. Indeed, the First Watertight Level (3) has the ability to be hermetically sealed, thus allowing the passage of waves in the event of severe weather, without significantly affecting the operation of the naval device, being able to operate safely in adverse weather conditions. Consistent with the above, the walkways or corridors (4) are appreciated, which for the solution presented in this case, are positioned at a height of 4 meters from the level of the first deck above the waterline which allows safely transit of crew, even though the first level is eventually surpassed by the waves.

Figure 3:
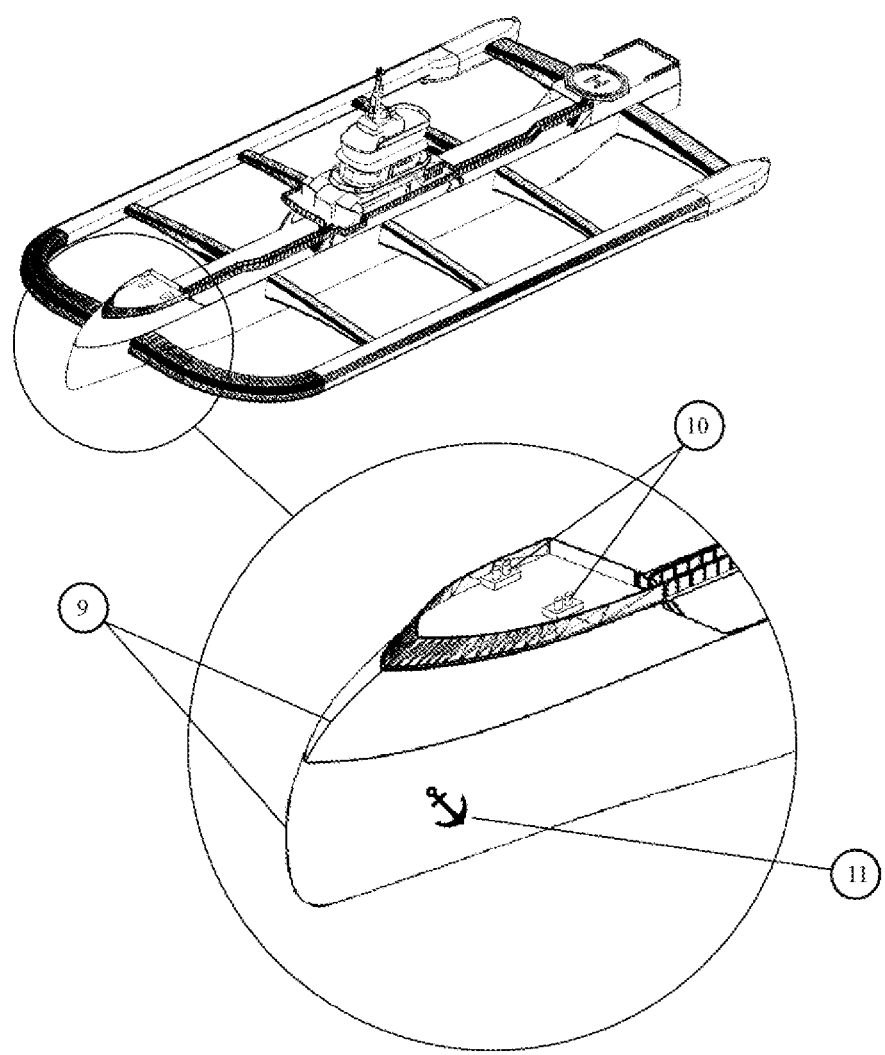
FIG. 3 shows a close-up view of the bow of the central hull of the mobile offshore cultivation center.

In the Habitability of this system (5) the activities necessary for the operation of this naval device are carried out, with areas designated for rest and recreation rooms, dining rooms, movement control area, tasks, and monitoring area for hydrobiological species and their environment FIG. 3 shows us the Wave Break Bow, consisting of the tip or bow of the central body of the naval device, which is designed for the fulfillment of a dual purpose, since on the one hand, and thanks to its hydrodynamic design, facilitates the movements of self-positioning and advance when moving from one place to another, either by itself, or in the event of being towed, reducing the resistance of the structure to water, and on the other, it fulfills a breakwater function by dividing or cutting the masses of water that rise in severe weather conditions in oceanic areas, thus reducing the adverse effect of the waves on the naval device and attenuating the large waves that could exceed the breakwater (9). Its design allows the installation of Tow Bitts (10), which are incorporated into the main structure, so that the containment system can be easily towed, in case of requiring a fast transfer or maneuvering in ports or areas, where such type of operations is required by the authority given its size. On the other hand, and without prejudice to other support systems, at the opposite end or its sides, also in the front part of the structure an Anchor (11) is observed with its respective maneuver, which once deployed, allows the production center to remain still in its position without the need to use its own motorization, always being oriented naturally with its wave breaking Bow towards the direction that most benefits it, according to weather conditions, sea currents and wind, which not only achieves a considerable reduction in position maintenance costs, but also replaces the traditional and expensive maneuvers of permanent anchoring that current coastal farming centers require.

Figure 4:
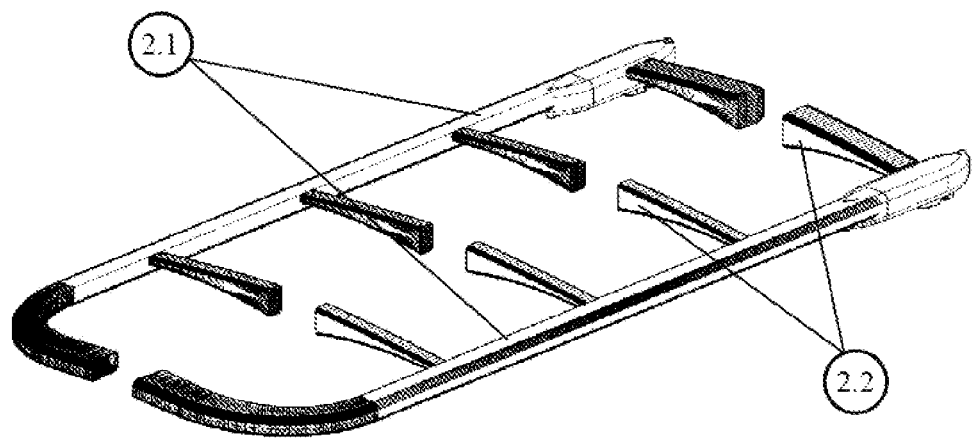
FIG. 4 shows an isometric view of the right and left perimeter support frames of the mobile offshore cultivation center.

In FIG. 4 we can see the Perimeter Support Frame (2.1), which fulfills a stabilizing and flotation function, on one hand, and holds and supports the metallic and/or heavyweight meshes, thus protecting the hydrobiological species contained, and stabilization of the system on the other, thanks to its design, which keeps the farming area leveled and supports the forces of waves and currents, largely neutralizing their effects and giving it greater stability. This allows to keep the operations and maintenance of the production center in operation, as much of the time as possible. Likewise, the Transverse Supports (2.2) that structure the system are appreciated, connecting and strengthening the union between the central body and the perimeter supports. These transverse supports are hollow but structural, double-walled and connected to the hull or central structure by strong elements by means of structural connectors. Thanks to their hollow design, they allow inspection from inside the structure itself, also serving as a pedestrian connection way to the perimeter frame and networks.

Figure 5:
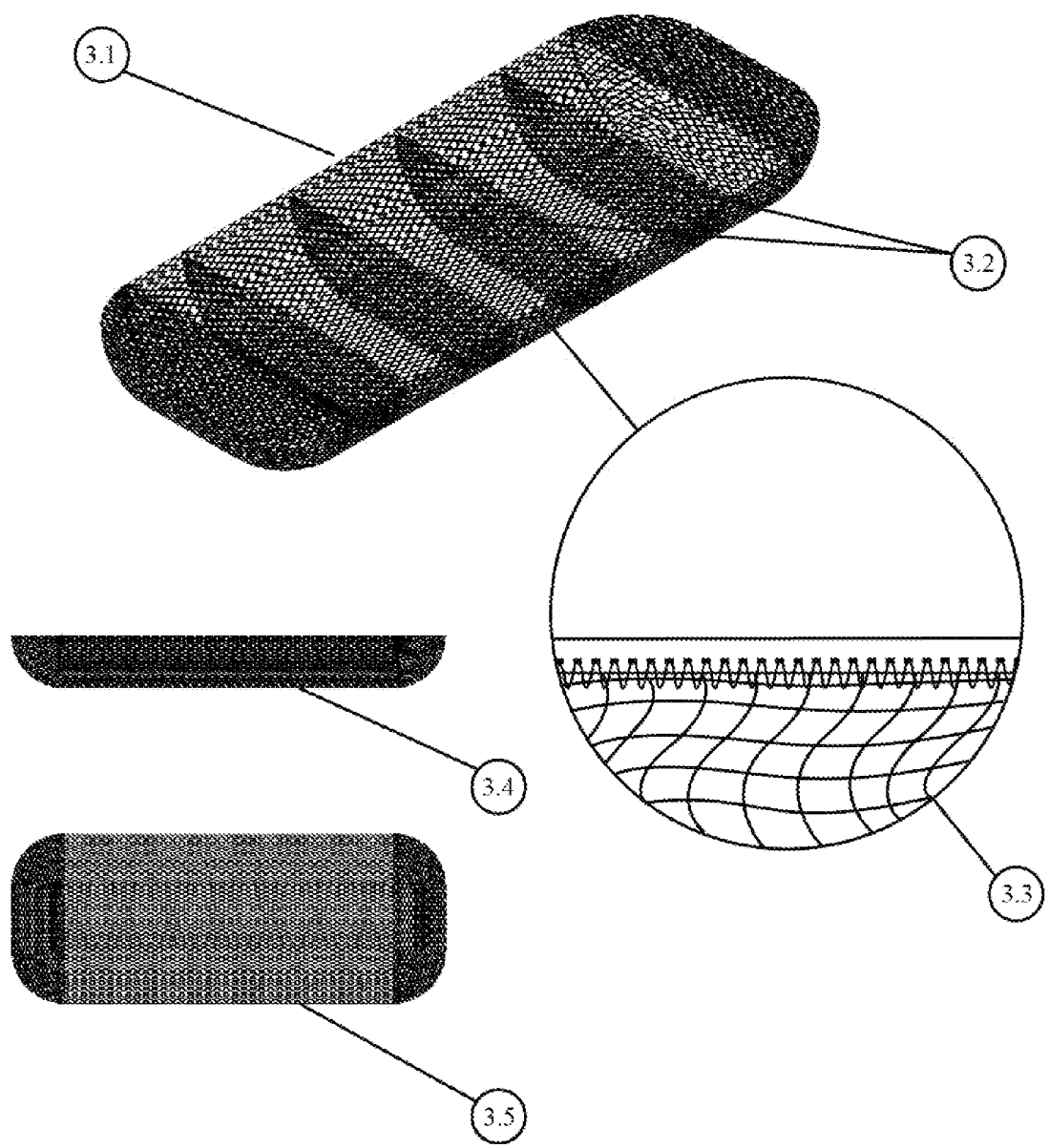
FIG. 5 shows an isometric, side, top and close-up views of the metallic mesh of the mobile offshore cultivation center.
Figure 6:
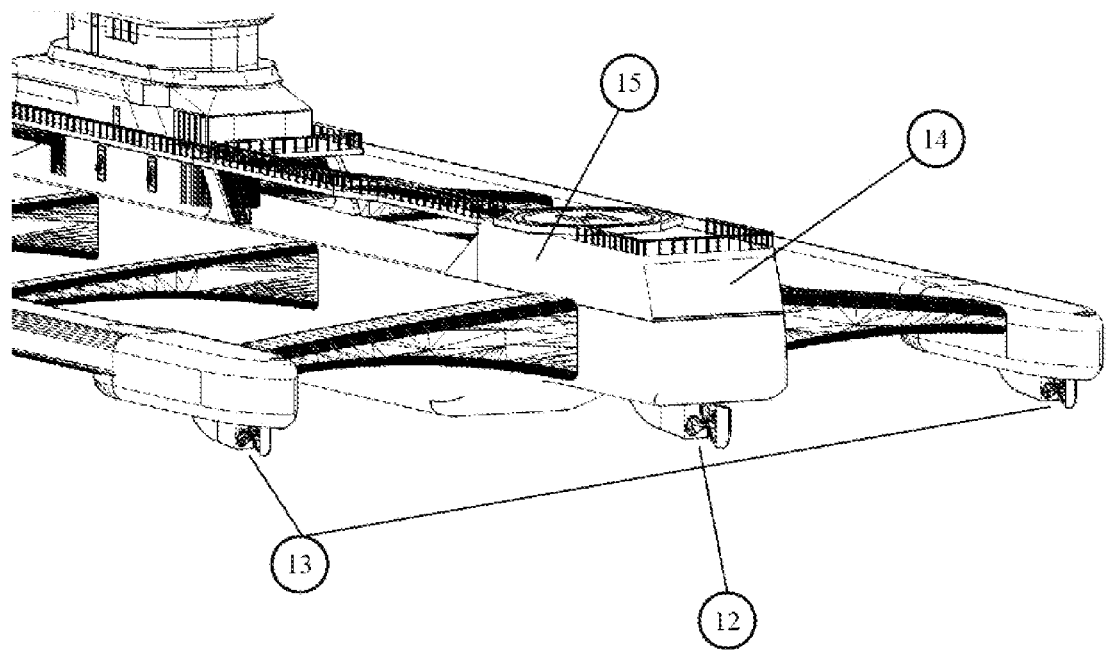
FIG. 6 shows a close-up view of the stern of the mobile offshore cultivation center.

The metallic and/or heavy weight meshes are illustrated in FIG. 5. They are uniformly distributed along the entire perimeter of the structure and the central hull of the farming center. They also have high external resistance that serve as external containment to maintain hydrobiological species in their places of growth, while offering protection to them from possible outside natural predators.

These meshes (3.1) are preferably constructed with copper alloys, given the characteristics of that metal, and the structure must be sufficiently reinforced, since these meshes have an approximate weight that ranges from 0.5 Kg to 12 Kg per square meter. This means that the production center must support a weight of the metallic meshes that will be between 40 to 400 metric tons depending on its size. For the proposed solution and without prejudice to the fact that it may vary at the end users request, the hydrobiological species production or farming center is presented, with a length ranging between 90 m and 250 m. The structure is also presented with dividing or subdivision meshes (3.2), which isolate the species in different compartments or cages, at the discretion of the end user, if necessary. In the same way, and at the request of the user, the solution can operate with a single large mesh that surrounds the entire perimeter of the structure, or the subdivisions that are desired or that are necessary according to the hydrobiological species that is intended to confine and/or fatten. The connection of said meshes with the main structure is carried out by means of ropes, connectors or another related system that prevents the mesh from detaching or collapsing in the face of waves or the normal or climatic requirements that this structure may face during its entire operation (3.3). Without prejudice to the fact that this type of meshes can be more or less rigid or flexible, arranged in panels, in rolls, or in patches or sections, for the proposed solution they are shown in the form of rolls unfolded and joined together. They also generate the possibility of using tensioners and restraints, to alter the structural shape of the production center's hull made up of the meshes at will, by means of geometric variation due to the effects of the maneuver designed for this purpose and to decrease or increase the volume of the submerged mesh, generating better conditions for the navigation of the fish farming center, or improving conditions for species in confinement.

On the other hand, thanks to the fact that this type of meshes behave structurally when submerged (3.4), they maintain the containment volume, without crushing the hydrobiological species in their interior when the farming center is moved from a place to another, or must withstand ocean currents, or faces adverse weather conditions (3.5).

The alternative for motorization of the device is illustrated in Image 6, which is constituted in the solution proposed by a main motor and two auxiliary ones, all of which together or separately have the function of granting the capacity that the cultivation system and/or fattening can be moved from one place to another, in order to avoid adverse weather conditions, or simply in search of the optimal conditions for breeding and/or fattening of the hydrobiological species inside.

The main propulsion motor (12) is located inside the rear part of the central hull, located directly below the area destined for its maintenance (14), since by means of a variable clamping system, it can be raised from its operating position to the work area, which enables maintenance maneuvers to be carried out in the place where the device is located, without the need to land the structure in port or other facility.

In the same way, two motors can be seen on the sides of the perimeter support frame (13), which for the present solution are of the electrical type, powered by a sufficient generating plant, located in the central structure (15), which not only It is in charge of providing energy for these auxiliary motors, but also for the rest of the artifact's systems.

Figure 7:
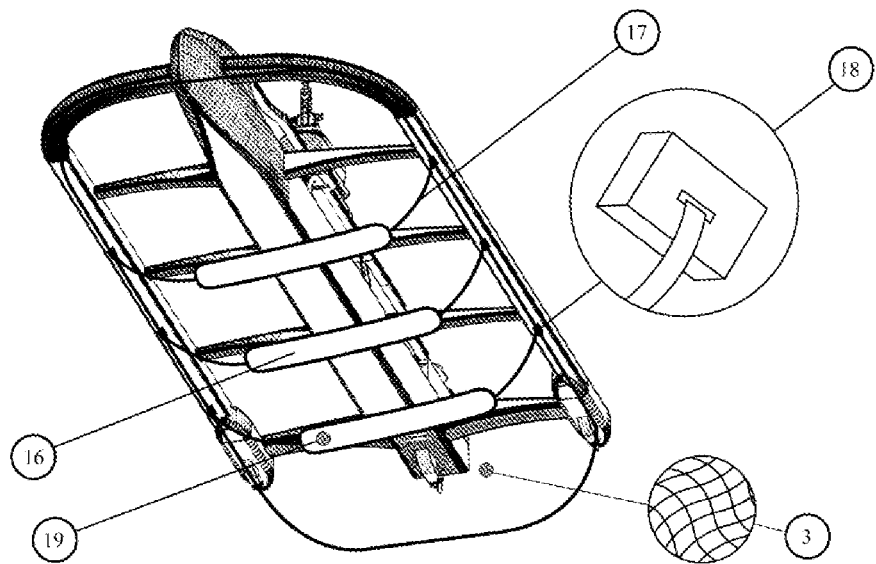
FIG. 7 shows a bottom isometric view of the mobile offshore cultivation center and the hoisting system for the metallic mesh.

FIG. 7 describes the mobility, lifting and volume change system of the submerged hull, normally known as the living work of a boat, production center or naval device. Number 16 shows a reinforced area attached to the bottom of a sector of the meshes that make up the hull of the production center, which allows receiving the efforts of the collection or lifting system of the volume of the mesh that makes up the hull of the production center, which ultimately causes the decrease of the living work or draft of the production center.

In turn, the band or sling made of non-metallic material (17) is appreciated, which thanks to its union with the reinforced band (16), allows the collection and shortening of said sling, without damaging the metallic meshes by friction, given its condition not metallic and designed with adequate resistance to stress, plus a safety factor.

Number 18 shows one of the sea boxes in which a winding winch system is stored, which operating with electro-hydraulic energy, allows lifting and collecting the slings, in a coordinated and controlled way, at the user's will. In the same way, it allows lowering to its position of maximum extension, extending fully the mesh, which according to its own weight, requires less effort, but always in a controlled manner.

It is also observed the reinforcement in the lower part of the hull of the production center (19), which is attached in the specific sectors shown in the figure, which has a constitution similar to the mesh indicated as 3 and that allows to receive the efforts of the slings and increasing the life spam of the hull and farming area of the production center.

Figure 8:
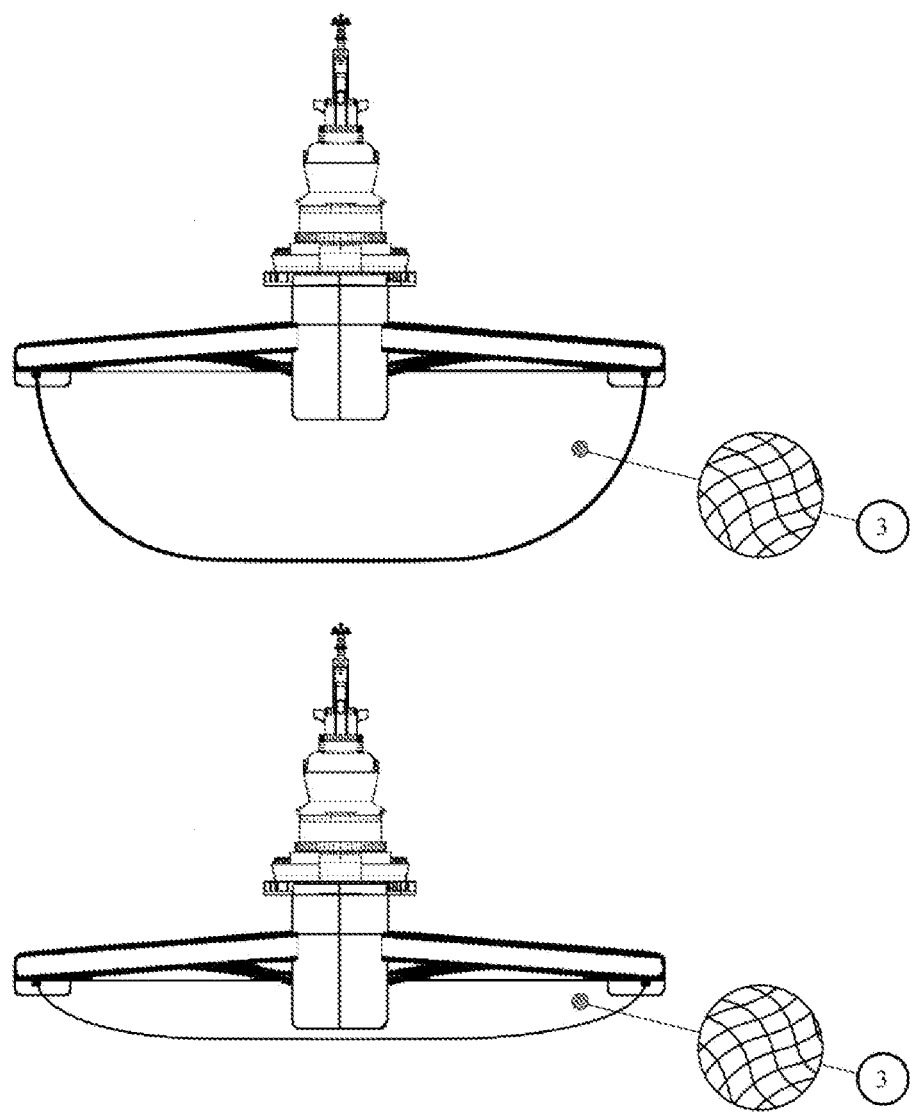
FIG. 8 shows a front view of the mobile offshore cultivation center with the mesh at an expanded condition and a compressed condition.

The description of the system of application of the lift and change of volume of the submerged hull, normally known as live work or farming area, can be seen in FIG. 8, which shows two views of the production center, appreciating the shape and distribution of the high weight metal mesh. (3) observing the variable surface constituted by the type of metal mesh.

FIG. 8, in the upper image, shows the production center with its hull deployed in a condition of maximum and normal design stretch and later. The image below, shows the production center's hull (mesh) decreased to the maximum allowed by design. By observing both representations, we can distinguish the considerable difference in volume between one position and the other, which allows generating a difference in opposition to advancement and resistance in movement, which at the same availability of thrust energy, will result in a faster movement. On the other hand, the alteration of the volume at full extension generates the optimal space conditions for the confined hydrobiological species, which thanks to the great availability of space, their location in the open sea and the water conditions, will be able to develop the natural behavior of the shoal type, observed in wild fish.

By having the ability to control the lift and therefore the volume of containment, a greater control of the production factors of hydrobiological species is allowed, both of the confined species, and of the resistance to navigation, and therefore, to be able to decide on the most favorable conditions for the species, according to the place and time in which the fish farming center is located at all times, this makes this invention unique with respect to all other patented innovations up to now.

The invention claimed is:

1. A mobile offshore cultivation center for the development of hydrobiological species, for their breeding, management and production, that allows operations on the surface and offshore navigation, with capacity and maneuvering and transferring to different locations, having minimal water resistance, comprising:
   a central hull having a main propulsion motor, wherein the central hull provides as a main support and as a majority buoyancy of the mobile offshore cultivation center, wherein the main propulsion motor provides movement of the mobile offshore cultivation center;
   a plurality of right transverse supports extending from a right side of the central hull, and a plurality of left transverse supports extending from a left side of the central hull,
      wherein a bottom side of each of the plurality of right transverse supports and a bottom side of each of the plurality of the left transverse supports are semi-elliptical arched beams, and a top side of each of the plurality of the right transverse supports and a top side of each of the plurality of the left transverse supports are straight beams;
   a right perimeter support frame joins with the plurality of right transverse supports, wherein a right lateral projection support frame extending from the right perimeter support frame connects to a front part of the right side of the central hull;
   a left perimeter support frame joins with the plurality of left transverse supports, wherein a left lateral projection support frame extending from the left perimeter support frame connects to the front part of the left side of the central hull,
      wherein the left and right lateral projection support frames and the left and right perimeter support frames together with the plurality of right and left transverse supports provide a trimaran shape that generates a containment area for hydrobiological species;

a metallic mesh submerged, which is attached to said lateral projection support frame to form the hull of the mobile cultivation and the cultivation area of said hydrobiological species, wherein the metallic mesh constitutes the central hull and also comprises a hoisting system for the metallic mesh from the perimeter support frame that allows the metallic mesh submerged achieve a change of volume of the submerged hull, which adjusts the hydrodynamic presentation of the farming center, reducing its resistance to water, allowing the harvest of hydrobiological species, and navigating in shallow waters by decreasing its depth, wherein the metallic mesh comprise a weight of between 40 and 400 metric tons, to provide stability to the mobile farming center.

2. The mobile offshore cultivation center for the development of hydrobiological species, intended for their breeding, management and production according to claim 1, comprising a breakwater placed at a bow, and wherein the main propulsion motor is located inside a the rear part of the central hull.

3. The mobile offshore cultivation center for the development of hydrobiological species, intended for their breeding, management and production according to claim 1, wherein the right and left transverse supports are hollow.

4. The mobile offshore cultivation center for the development of hydrobiological species, intended for their breeding, management and production according to claim 1, wherein the metallic mesh is made of copper alloy, which provides stability to the mobile cultivation center.

5. The mobile offshore cultivation center for the development of hydrobiological species, Intended for their breeding, management and production according to claim 1, wherein the metallic mesh comprises divisions or subdivision meshes.

6. The mobile offshore cultivation center for the development of hydrobiological species, intended for their breeding, management and production according to claim 1, comprising two auxiliary motors placed in the right and left perimeter support frames.

7. The mobile offshore cultivation center for the development of hydrobiological species, intended for their breeding, management and production according to claim 1, wherein the central hull comprises a length ranging between 90 m and 250 m.

8. The mobile offshore cultivation center for the development of hydrobiological species, intended for their breeding, management and production according to claim 1, wherein the hoisting system comprises a winding winch system configured to hoist the metallic mesh and to collect the slings in a coordinated and controlled way.

9. The mobile offshore cultivation center for the development of hydrobiological species, intended for their breeding, management and production according to claim 1, wherein the metallic mesh has a weight that ranges from 0.5 Kg to 12 Kg per square meter to provide a shoal type in the confined hydrobiological species.

* * * * *